United States Patent
Wonnacott

(10) Patent No.: US 8,909,802 B2
(45) Date of Patent: Dec. 9, 2014

(54) MULTIPLE ADDRESS HYPERLINKS

(75) Inventor: Paul Wonnacott, Malvern (GB)

(73) Assignee: VocalComm Group, LLC, Wilmington, DE (US)

( * ) Notice: Subject to any disclaimer, the term of this patent is extended or adjusted under 35 U.S.C. 154(b) by 1646 days.

(21) Appl. No.: 11/597,125

(22) PCT Filed: May 18, 2005

(86) PCT No.: PCT/GB2005/001912
§ 371 (c)(1),
(2), (4) Date: Nov. 20, 2006

(87) PCT Pub. No.: WO2005/114471
PCT Pub. Date: Dec. 1, 2005

(65) Prior Publication Data
US 2007/0288565 A1    Dec. 13, 2007

(30) Foreign Application Priority Data

May 21, 2004  (GB) .................................. 0411331.2

(51) Int. Cl.
*G06F 15/16* (2006.01)
*H04L 29/08* (2006.01)
*H04L 29/12* (2006.01)

(52) U.S. Cl.
CPC ......... *H04L 67/104* (2013.01); *H04L 29/12801* (2013.01); *H04L 61/6004* (2013.01); *H04L 67/1068* (2013.01)
USPC .......................................... 709/230; 709/203

(58) Field of Classification Search
USPC ................................................ 709/203, 230
See application file for complete search history.

(56) References Cited

U.S. PATENT DOCUMENTS

| | | | |
|---|---|---|---|
| 5,870,546 A | 2/1999 | Kirsch | |
| 6,029,175 A * | 2/2000 | Chow et al. | 1/1 |
| 6,081,900 A * | 6/2000 | Subramaniam et al. | 726/19 |
| 6,330,605 B1 * | 12/2001 | Christensen et al. | 709/226 |
| 6,604,143 B1 * | 8/2003 | Nagar et al. | 709/229 |
| 6,925,595 B1 * | 8/2005 | Whitledge et al. | 715/234 |
| 7,818,435 B1 * | 10/2010 | Jellinek | 709/229 |
| 2002/0073075 A1 * | 6/2002 | Dutta et al. | 707/3 |

(Continued)

FOREIGN PATENT DOCUMENTS

| | | |
|---|---|---|
| EP | 0 998 097 | 5/2000 |
| WO | 2001031888 | 5/2001 |
| WO | 2005114471 | 12/2005 |

OTHER PUBLICATIONS

Berners-Lee, Fielding, Masinter, "Uniform Resource Identifier (URI): Generic Syntax", Jan. 2005, Network Working Group, Request for Comments (RFC) 3986.*

(Continued)

*Primary Examiner* — Nicholas Jensen
(74) *Attorney, Agent, or Firm* — Stolowitz Ford Cowger LLP

(57) ABSTRACT

A form of hyperlink is provided comprising a first component identifying a network entity and a scheme by which to communicate with that entity, and a second component comprising a further scheme and further address by means of which to access a resource relative to the network entity identified by the first component. Such hyperlinks support simple and fast sharing of files and, in some cases, support tunnelling through firewalls to achieve this. The invention also provides related data representations, electronic documents, protocols, signals, methods, devices, systems and other apparatus, and programs for computers.

7 Claims, 7 Drawing Sheets

(56) References Cited

U.S. PATENT DOCUMENTS

| | | | | |
|---|---|---|---|---|
| 2002/0143855 | A1* | 10/2002 | Traversat et al. | 709/202 |
| 2003/0061515 | A1* | 3/2003 | Kindberg et al. | 713/201 |
| 2003/0195870 | A1 | 10/2003 | Newcombe et al. | |
| 2003/0208570 | A1* | 11/2003 | Lapidous | 709/222 |
| 2004/0128538 | A1* | 7/2004 | Gmuender et al. | 713/201 |
| 2005/0044185 | A1* | 2/2005 | Hind et al. | 709/219 |
| 2005/0114367 | A1* | 5/2005 | Serebrennikov | 707/100 |
| 2005/0198332 | A1* | 9/2005 | Laertz et al. | 709/229 |

OTHER PUBLICATIONS

Chapweske, "HTTP Exentions for a Content-Addressable Web" May 12, 2002, Onion Networks, open-content.net/specs/draft-jchapweske-caw-03.html.*

Daniel, "A Trivial Convention of using HTTP in URN Resolution", Jun. 1997, Network Working Group, Request for Comments (RFC) 2169.*

Kunze et al., The ARK Persisten Identifier Scheme, Jan. 31, 2004, Internet Draft, draft-kunze-ark-07.txt, pp. 1-40.*

Phoenix, Chris and Gramlich, Wayne: "Serving the Web as a File System", IP.COM Inc., West Henrietta, NY, Aug. 9, 2002, XP013004149 ISSN:1533-0001.

Masinter, L. (Xerox Corporation), Alvestrand, H. (Maxware et al) : "Guidelines for New URL Schemes", IETF Standard, Internet Engineerng Task Force, IETF,CH, Nov. 1999, XP015008501 ISSN 0000-0003.

Berners-Lee, T. (CERN), and Masinter, L. (Xerox Corporation), McCahill, M. (University of Minnesota) Editors: "Uniform Resource Locators (URL)" IETF Standard, Internet Engineering Task Force, IETF, CH, Dec. 1994, XP015007525 Issn 0000-0003.

International Bureau of WIPO, "International Preliminary Report on Patentability", PCT/GB05/001912, dated Nov. 21, 2006, 11 pages.

European Patent Office, "International Search Report and Written Opinion", PCT/GB05/001912, dated Oct. 21, 2005, 17 pages.

United Kingdom Patent Office, "Search Report", GB0411331.2, dated Aug. 11, 2004, 3 pages.

KarinaGW, Jul. 15, 2003, "need a two part url—help!", WebmasterWorld.com [online], Available from: http://www.webmasterworld.com/forum21/5647.htm [Oct. 9, 2004] (website accessed on Mar. 21, 2013).

IEEE Internet Computing, May-Jun. 2001, Li Gong, "JXTA: A Network Programming Environment", p. 88-95, ISSN 1089-7801.

* cited by examiner

MULTIPLE ADDRESS HYPERLINKS

FIELD OF THE INVENTION

The present invention relates to data addressing and access methods and apparatus, signals, programs for a computer, related data structures and their representations along with systems incorporating the same.

In particular, the present invention relates to, but is not restricted to, improvements related to hyperlinks for use in distributed computerised networks.

BACKGROUND TO THE INVENTION

Recent computer-based systems have been directed to providing support for rapid creation of simple web pages by users of minimal skill. Such systems are sometimes known as "Wikis" (from the Hawaiian expression "wiki wiki" meaning "fast"). Many such systems however provide users only with a text-based user interface, which limits their adoption by less skilled users. Some wikis therefore provide a so-called What You See Is What you Get (WYSIWYG) interface in an attempt to make such systems accessible to a wider user base.

Wikis may be used to create personal wikis: local "webs" for personal use, for example on a user's own personal computer, and in which many of the links may be made to local resources (e.g. files) rather than to remote resources using for example the Hypertext Transfer Protocol (HTTP). The ability to create such local web structures quickly and easily allows users to organise their own files in novel ways, by constructing local web pages which comprise hyperlinks to local files, and to determine their own page access and control policies.

However a problem with such systems is that, whilst such local web pages may be sent to other users, the local hyperlinks embedded within those pages are not effective on remote host computers, or indeed when selected by other users on the same computer, since they identify the resource locally relative to the creating user's local work space.

Peer-to-peer (P2P) computing is a model of distributed computing which does not distinguish between client and server computers (or software entities on computers), so that every computer (referred to as a peer) may act either as a client or as a server or as both. Related peers may be grouped together to form peer groups. The peer-to-peer paradigm is therefore quite distinct from the conventional client-server model of web-based applications in which servers provide services to clients but not vice versa. P2P computing is also characterised by the way in which computers are identified, and by the decentralised way in which computer identifiers are used to determine the mechanism by which one computer communicates with one or more other computers. This gives P2P computing an ability to traverse firewalls and accommodate Networks Address Translation (NAT) and the use of Dynamic Host Configuration Protocol (DHCP). Other known P2P frameworks (for example JXTA) use Relay and Rendezvous peers to achieve this.

P2P computing is often associated with file-sharing applications (such as Gnutella, Napster, WinMX® and Fileutopia) and Instant Messaging (IM).

Use of Asynchronous Pluggable Protocols within systems such as Microsoft Windows® gives users the ability to integrate new functionality within existing systems by substituting new protocols for existing ones. Such substitutions can be effected in such a way that almost any Windows application can subsequently make use of the new functionality. In particular, Windows provides an Asynchronous Pluggable Protocol (APP) to support interpretation of the Hypertext Transfer Protocol (HTTP) Uniform Resource Locator (URL) scheme used to reference remote resources on the web. Changes made to the HTTP URL scheme may therefore be implemented by substituting an amended HTTP APP. Remote resources referenced by hyperlinks are subsequently automatically accessed using the amended protocol from any application having links to a web page.

An example of how known web-based access systems operate is illustrated in FIG. 1. Server 10 comprises a file store 103 which contains web-accessible files 1030 and non-web-accessible files 1031. Local clients 104 (typically supporting local users) access files 1040 (for example web pages, spreadsheets, or text files) comprising one or more hyperlinks. These may take the known forms of HTTP URLs ("http:// . . . ") 1041 or File URLs (file:// . . . ) 1042.

Such URLs are interpreted locally with reference to the local file management 103 or HTTP-client software. File-URLs result in direct access of locally stored file, including both web-accessible files 1030 and non-web-accessible files. HTTP-URLs result in access of the indicated file via a local HTTP client: the HTTP client determines whether the file is local or remote and accesses the web-accessible local file 1030 or a remote server accordingly.

A remote client 11 may also resolve URLs 1141 in locally accessible documents 114 but in that case the only URLs which resolve to a file on Server 10 are those which are HTTP-URLs. Typically such URLs may also refer to files on other servers 12.

A problem with this approach is that if a user on server 10 wishes to make a file available over the web to another (possibly remote) user, the file must first be copied or moved into the local web-accessible file area 1030 since there is no mechanism by which a remote user 11 can access the non-web-accessible files 1031 over the web.

A further problem is that if a first user is located within a first naming domain and wishes to make a file accessible to a second user in a second, different naming domain, then this is not easily achieved since resolution of the file address known to the first user in the second user's domain may not be successful. It is therefore desirable, at least in some cases, to provide means by which users my readily share files in such circumstances.

OBJECT OF THE INVENTION

The present invention seeks to mitigate at least one problem associated with the prior art.

SUMMARY OF THE INVENTION

The invention is directed to data representations, apparatus, and computer programs which comprise, refer to, or make use of novel network resource addresses and methods of using them.

According to a first aspect of the present invention there is provided a computer-readable representation of a hyperlink address comprising a first portion comprising identification of a host and a first access scheme for interacting with that host and a second portion comprising a further hyperlink address comprising a second access scheme.

The further hyperlink address may be a Uniform Resource Locator.

The further hyperlink address may itself be a hyperlink address so that the second portion itself has a first and second portion.

The first access scheme may be a peer-to-peer access scheme.

The second access scheme may denote a HyperText Transfer Protocol (HTTP)

The second access scheme may be a local file access scheme.

According to a further aspect of the present invention there is provided a method of resolving a computer-readable representation of a hyperlink address according to the first aspect on a given host, the method comprising: resolving the first portion to identify a host upon which to resolve the second portion; if the host is the local host resolving the second portion locally; if the host is not the local host, communicating the second portion to the host, by means of the first access scheme, for resolution of the second portion by the host.

According to a further aspect of the present invention there is provided an electronic document comprising a computer-readable representation of a hyperlink address according to the first aspect.

The invention also provides for programs for computers in a machine-readable form and arranged, in operation, to carry out every function of the apparatus and/or methods. In this context this is understood to include source and executable code and other forms including, but not limited to, code intended for or suitable for compilation to hardware layouts, or programming of re-configurable hardware such as Field Programmable Gate Arrays (FPGAs).

In particular, according to a further aspect of the present invention there is provided a program for a computer arranged to create a computer-readable representation of a hyperlink address according to the first aspect.

The program for a computer may comprise an editor comprising a graphical user interface and arranged to facilitate insertion of a computer-readable representation of a hyperlink address by means of a drag-and-drop user interface.

According to a further aspect of the present invention there is provided a computer system arranged to create a computer-readable representation of a hyperlink address according to the first aspect.

According to a further aspect of the present invention there is provided a program for a computer arranged to parse a computer-readable representation of a hyperlink address according to the first aspect.

According to a further aspect of the present invention there is provided a computer system arranged to parse a computer-readable representation of a hyperlink address according to the first aspect.

The invention is also directed to signals employed by the other aspects of the invention.

In particular, according to a further aspect of the present invention there is provided a communications signal comprising computer-readable representation of a hyperlink address according to the first aspect.

According to a further aspect of the present invention there is provided a computer system arranged to process signal comprising computer-readable representation of a hyperlink address according to the first aspect.

According to a further aspect of the present invention there is provided a method of accessing a resource on a computerised network by means of a computer-readable representation of a hyperlink address according to the first aspect.

According to a further aspect of the present invention there is provided a system arranged to access a resource on a computerised network by means of a computer-readable representation of a hyperlink address according to the first aspect.

The invention also provides for a system which comprises one or more instances of apparatus embodying the present invention, together with other additional apparatus. The invention is also directed to methods by which the described apparatus operates and including method steps for carrying out every function of the apparatus.

The invention is also directed to hyperlinks, methods, programs for a computer, devices and systems substantially as described below and with reference to the accompanying drawings.

The preferred features may be combined as appropriate, as would be apparent to a skilled person, and may be combined with any of the aspects of the invention. Other advantages of the invention, beyond the examples indicated above, will also be apparent to the person skilled in the art.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
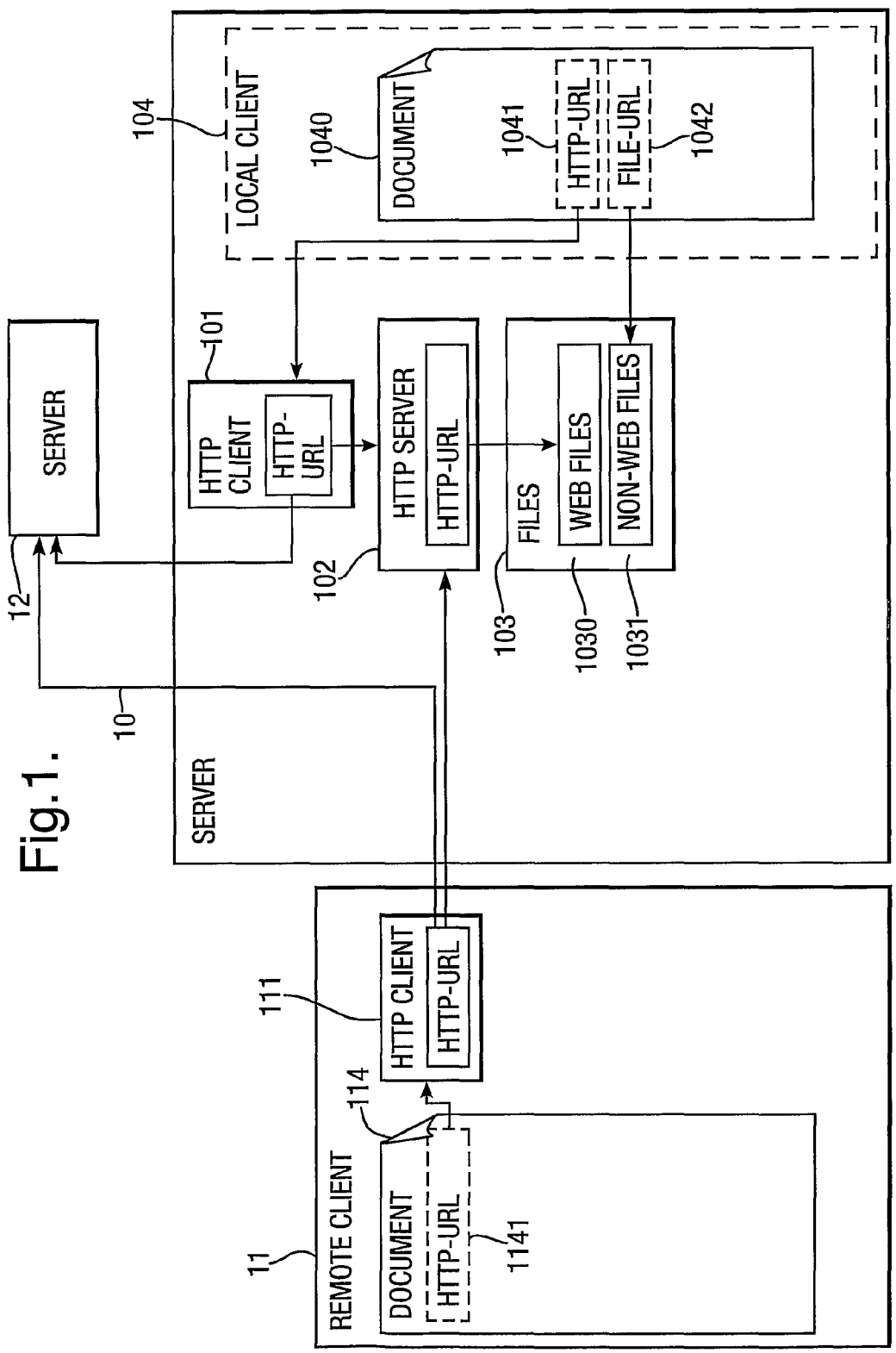
FIG. 1 shows a schematic diagram of a known computer network.
Figure 2:
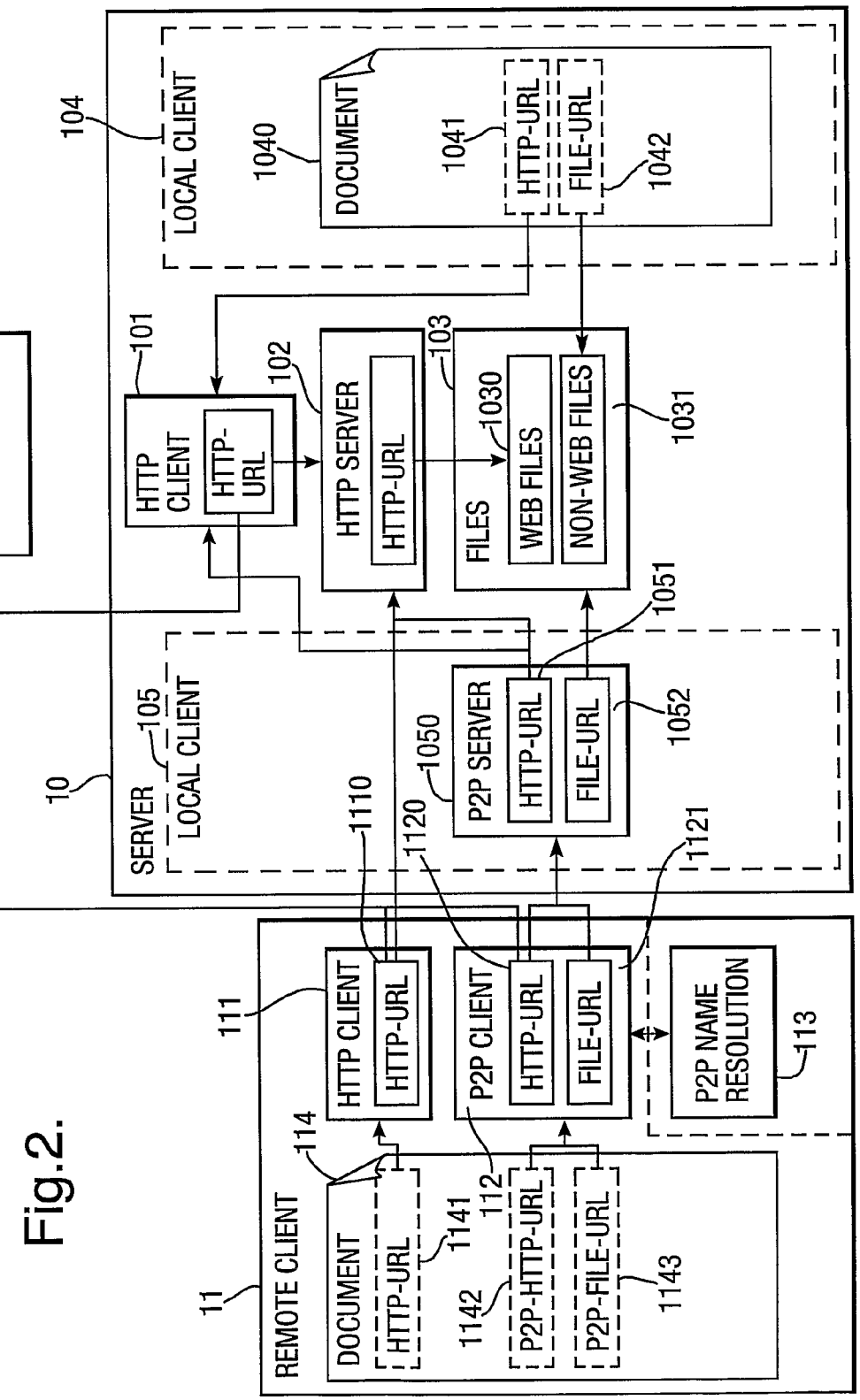
FIG. 2 shows a schematic diagram of a computer network in accordance with the present invention.

Referring now to FIG. 2, a remote client 11 and a server 10 are provided with a P2P client 112 and P2P server 1050 respectively. New forms of resource locator 1142, 1143 are introduced which are identifiable as requiring, for correct resolution, invocation of the new P2P client 112 in the remote client. The new URL has at least one portion which is intended for interpretation, not on the remote client 11, but rather on the server 10. A further portion intended for interpretation on the remote client 11 indicates upon which of the servers 10, 12 the other portion is to be interpreted in much the same way as the domain name portion of known URLs operates.

As result a new resource locator 1142 indicating access via HTTP relative to server 10 would be passed to the local P2P client which in turn would forward the portion for remote resolution to the P2P server 1050 running as local client 105 on server 10.

The indicated HTTP URL is then resolved in the known fashion to retrieve whichever web file—local 1030 or remote 12—is indicated, relative to server 10. As a local client the P2P server can access files denoted by any form of URL formerly accessible to local client 104, including "file:// . . ." URLs.

Figure 3:
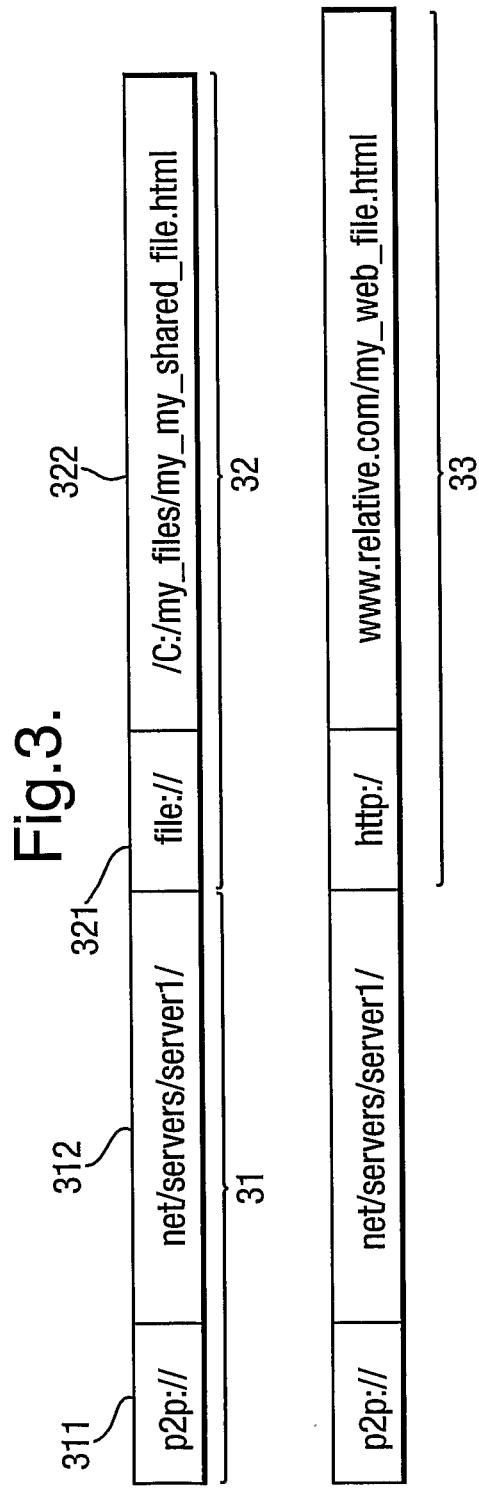
FIG. 3 shows examples of resource locators in accordance with the present invention.

Referring now to FIG. 3, the mechanism is supported by an new form of hyperlink address comprising an extended resource locator (or "hyperlink"), resource_locator, for use particularly in a distributed computer network environment. The resource locator comprises a peer locator component 31 peer_locator, and a local resource locator component 32, local_resource_locator, the abstract syntax of which is denoted as:

<resource_locator>::=<peer_locator><local_resource_locator>

The peer locator may be of a form similar to that for known resource locators (e.g. URL's), and comprises a peer scheme identifier 311, peer_scheme, and a peer identifier 312, peer_identifier, which uniquely identifies the peer of interest:

<peer_locator>::=<peer_scheme><peer_identifier>

The local resource locator, local_resource_locator, is provided to identify the required resource relative to the peer entity denoted by the peer locator. The local resource locator comprises both a resource scheme identifier 321, resource_scheme, and a resource identifier 322, resource identifier:

<local_resource_locator>::=<resource_scheme><resource_identifier>

In combination the components of the peer locator are interpreted with reference to suitable address resolution mechanisms to provide access to resources local to a peer <peer_identifier> using access scheme<peer_scheme>. For example, adopting a concrete syntax similar to that commonly used for known URL's a peer locator may take the form:

p2p://net/servers/server1 in which "p2p" denotes the peer scheme (or protocol) and "net/servers/server1" denotes the peer entity to be accessed.

Resolution of both the peer scheme component and the peer identifier component may be performed using conventional name resolution techniques, whether centralised or distributed.

The local resource locator may take the form of any convention URL, for example:

file:///C:/my_files/my_shared_file.html so that a complete resource locator may take the form:

p2p://net/servers/server1/file:///C:/my_files/my_shared_file.html

Clearly the precise concrete syntax illustrated is not essential and other concrete syntaxes may be employed. However the use of a concrete syntax broadly in line with that for known URLs as exemplified above will minimise the changes necessary to existing resource locator interpretation software.

The local resource locator is resolved with respect to the resolution rules associated with the peer entity identified by the peer locator portion of the resource locator.

However the form of the local resource locator is not limited to file:// . . . URLs: other known forms may also be employed including in particular HTTP links 33 of the form "http:// . . . ". In such cases the local resource locator may denote a resource local to the host denoted by the peer locator or remote to it. Interpretation of the HTTP URL is performed in a convention fashion on the identified peer entity. Extended resource locators of this and similar forms may be used to tunnel through firewalls so as to access, from a first network domain, files conventionally accessible only from within a second domain in which the identified peer entity is located. In this context the peer locator may denote a peer domain rather than any specific peer host, provided that interpretation of the local resource locator portion is uniformly resolved across the peer domain.

In the cases above the local resource locator takes the form of a conventional URL as defined, for example, by the World-Wide Web consortium (W3C). In such cases evaluation of the resource locator may proceed in the known way, the results of the evaluation being passed to the original requester by means of the protocol identified in the peer locator scheme.

However the present invention is not limited to such simple cases and may be extended to provide more complex resource locators in which the local resource locator may also take the form of a extended resource locator also having a peer locator component, so that the resource locator may take the recursive form:

<resource_locator>::=<peer_locator><local_resource_locator>|<peer_locator><resource_locator>

In this way resolution of a resource locator may involve traversing of multiple peer entities identified by successive peer locators in the resource locator. The number of indirections supported is limited in principle only by any limit on the overall length of resource locator.

Resources accessed by these methods are typically web pages or other files located on a peer entity. The peer is typically a device on a computer network and such devices include—but are not limited to—personal computer, laptop computers, servers, mobile telephone device, and personal digital assistants (PDAs). In a peer-to-peer network peer entities have broadly equal status and may act as servers (supplier of resources), clients (requesters of resources), or both simultaneously.

Whilst conventional URL's support local access of local files, for example using resource locators of the form "file:///C:/my_files/my_shared_file.html", remote entities are unable to access the named file using such a locator. However by providing the peer locator component which identifies the peer relative to which the given resource locator may be successfully resolved enhanced access capabilities can be provided.

The use of an asynchronous pluggable protocol to implement the necessary support to handle the new resource locators provides a means for users transparently to access hitherto inaccessible resources on a peer-to-peer network. Access to those hitherto inaccessible resources is readily integrated with known access methods for resources in a simple, consistent, and easy to use manner.

Figure 4:
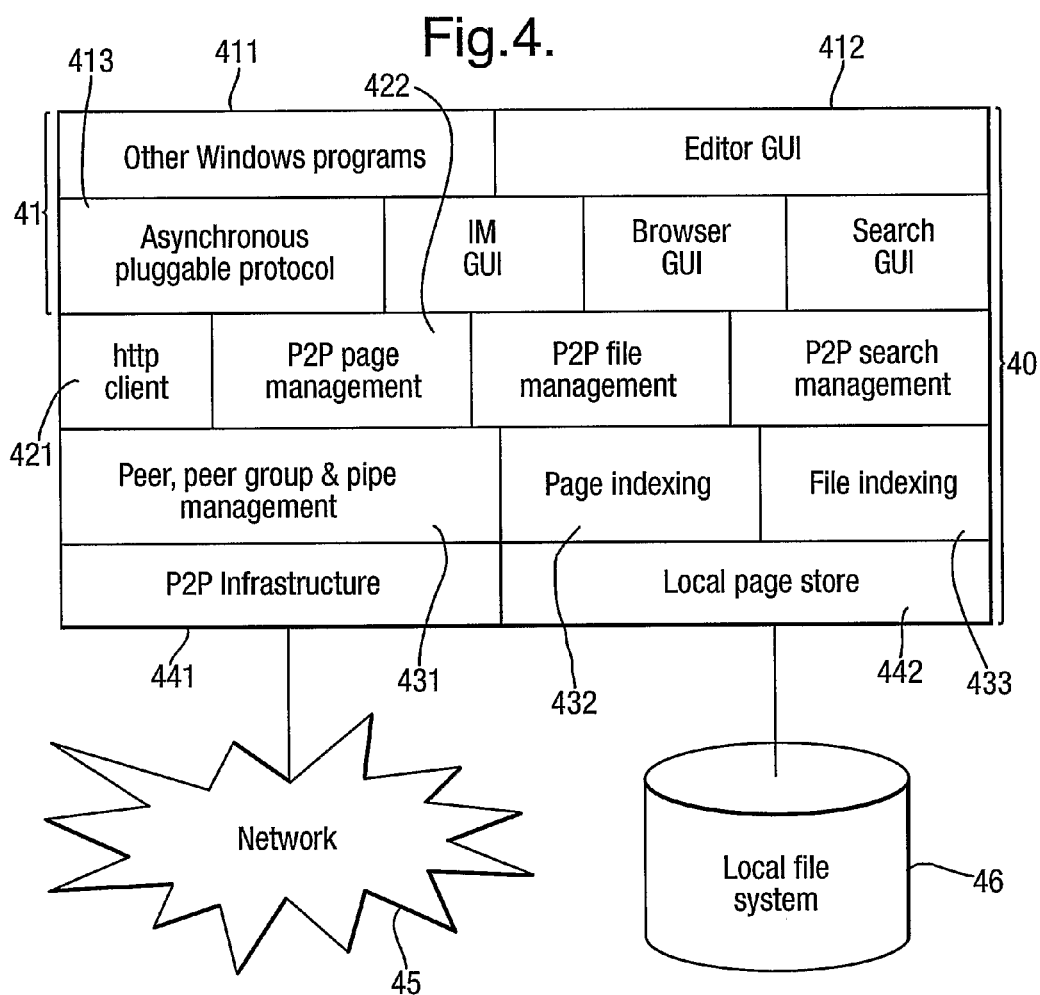
FIG. 4 shows a schematic diagram of a system in accordance with the present invention.

Referring now to FIG. 4, the outline structure of a system capable of implementing the extended resource locators is shown.

The system 40 comprises conventional user software entities 41 (for example Microsoft™ Windows™ programs 411 and editor Graphical User Interfaces 412) above an APP 413. The upper layers make use of HTTP client 421 and P2P client 422 software which control remote interactions with other peer entities. At the lower layers P2P group and pipe management 431 and other infrastructure 441 is provided to provide the interface to remote entities 45, whilst local file store 46 access is controlled by page indexing 432, file indexing 433 and local pages store management 442 software.

Implementation of the constructions described above is relatively straightforward and may be achieved in a many ways. The Asynchronous Pluggable Protocol (APP) integrates the new resource locator scheme into Microsoft Windows so that Internet Explorer or any other Windows application can link to wiki pages or access resources from the P2P network. This provides efficient and seamless access to resources (including wiki pages) on the peer to peer network.

Implementation of the APP of Windows is well documented, using the IIternetProtocol and IInternetProtocoInfo interfaces, the latter being required to combine base and relative URL's correctly. A protocol handler written in C++ makes use of the services provided by the P2P page and file management components. These are arranged to fetch the identified page, file, or other resource over the P2P network and then stream the results back to the Microsoft Internet Explorer or other requesting application. In one embodiment these components are written in Java, so that Direct Data Exchange (DDE) messages are used to handle communications between the protocol handler and these components. The APP also provides support for sending HTTP requests over the P2P network using an Open Source Apache HTTP client.

Figure 5:
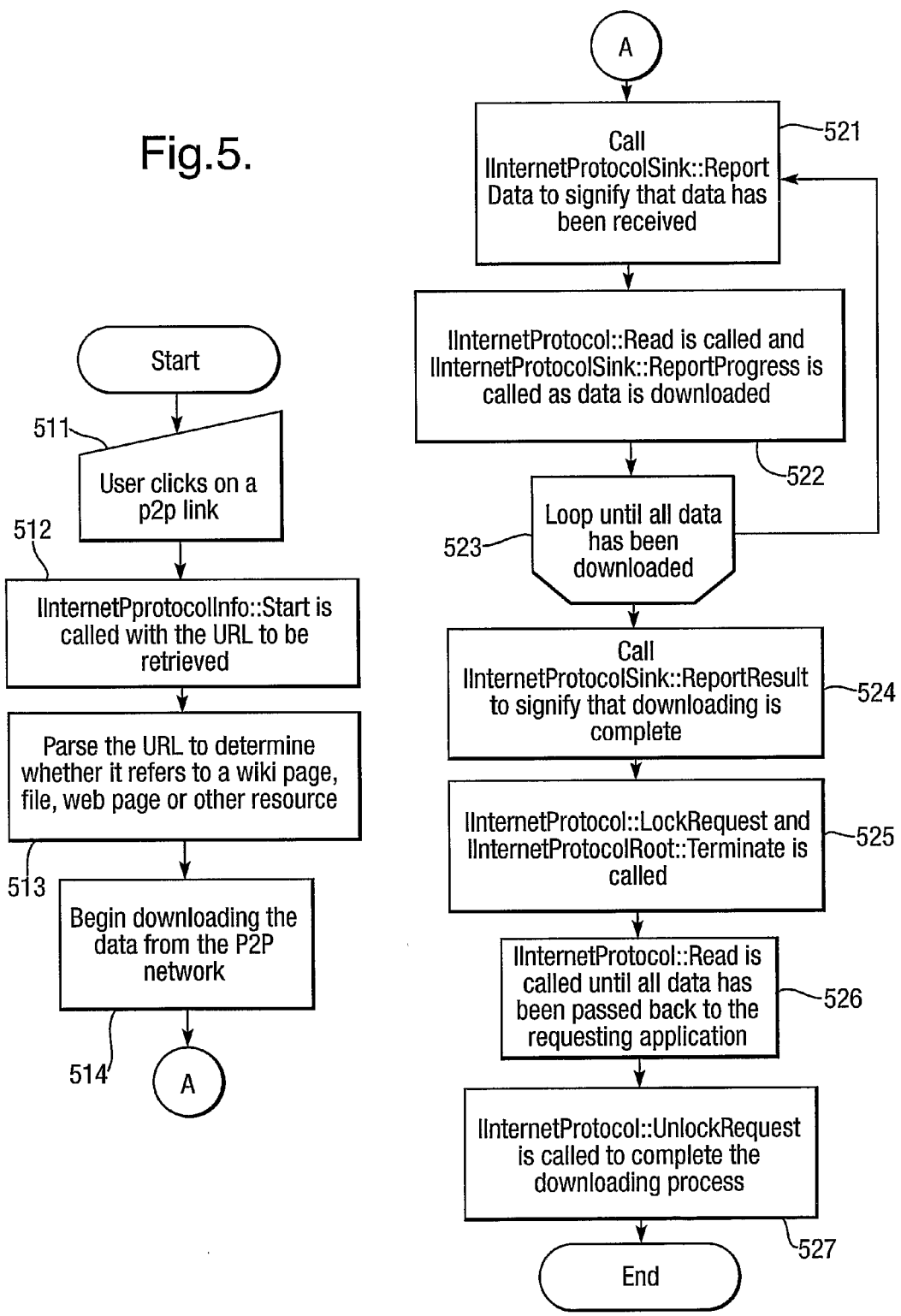
FIG. 5 shows a flowchart of a method for accessing resources using a hyperlink according to the present invention.

Referring now to FIG. 5 an example access method comprises a resource locator link being selected 511 by a user or user application. The selected resource locator is passed 512 to IInternetProtocolInfo for parsing 5123, whereby the nature and location of the resource to be accessed is determined.

Downloading proceeds 514 until all data has been received. The precise method and duration of the downloading, depending upon the nature of the resource accessed. IInternetProtocol::Read and IinternetProtocolSink are repeatedly invoked 522 until all data has been downloaded 523. IinternetProtocolSink, is invoked 521 to signify that access is completed.IInternetProtocol::LockRequest and IInternetProtocol::Terminate are then called 525 to complete the procedure before invoking IInternetProtocol::Read to pass the requested information back 526 to the requesting user application. Downloading is completed 527 by invoking IInternetProtocol::UnlockRequest.

Peer identifiers may take any of many forms:
Identifiers automatically generated by known techniques;
Individually assigned with manual intervention;
Use of email addresses (e.g. "p2p://bigal@myaddress.mynet")

In the case of email addresses, resolution may involve associating a current "home" peer entity with each email address (e.g. the host id to which email sent to the given address is normally delivered) and using this default destination as the current peer location of the user. In this way if a user relocates to a new file server host and email delivery point resolution of resource locators will automatically "follow" the user to the new host.

In a system supporting resource locators a WYSIWYG editor may also be provided. In one embodiment this may take the form of an extension to Microsoft Internet Explorer or other web browser/editor. A browser helper object is used to detect when an object comprising a resource locator as described above is loaded using the APP. This then activates an editor having a toolbar. The toolbar provides buttons and underlying functionality to create a new page, and search or browse for an existing page or shared resource. This may, for example, be implemented using appropriate Java GUI's using DDE messages though other implementations may also be used. The toolbar may either be shown by default or provided as a user-selectable option.

While editing a page, normal formatting options may be provided but additional functionality related to the new resource locators described above is also provided. In particular references to local files which are inserted in the page being edited are automatically modified to take the form of resource locators comprising a peer-to-peer locator. So for example a local hyperlink such as:
file:///C:/my_images/my_shared_image.jpg
may be replaced by a resource locator of the form:
p2p://net/servers/server1/file:///C:/my_images/my_shared_image.jpg This may be achieved in any one of many ways as would be apparent to the person skilled in art, including:
an icon associated with of the file to be referenced may be dragged-and-dropped into the editor interface and the hyperlink automatically generated comprising a peer locator upon insertion;
the icon may be dragged-and-dropped to insert a conventional local "file://" URL and conversion to the new peer-locator form only performed upon explicit request by the user (for example by means of an option on a drop-down menu selectable with respect to the newly inserted hyperlink);
A conventional URL may be inserted giving a location relative to the local host as the page is constructed and converted afterwards to comprise a peer locator as a "batch" job applied to all identified references within the file (for example automatically when such a page is emailed to a third party).

Figure 6:
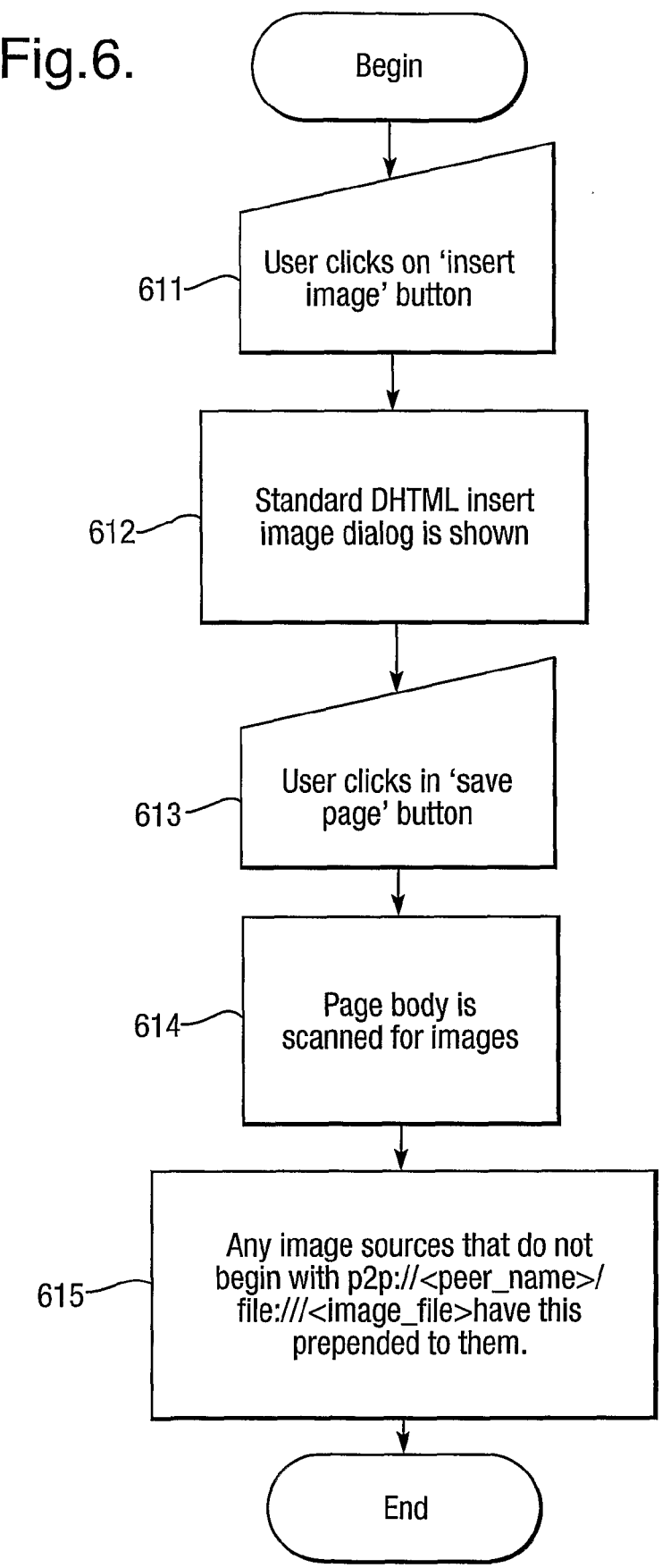
FIG. 6 shows a flowchart of a method for inserting hyperlinks according to the present invention.

Referring now to FIG. 6 one such method comprises a user selecting 611 "insert image" from a suitable on-screen menu. A Dynamic HTML (DHTML) dialog box is opened 612 which allows the user to select and insert an image of interest. Upon saving 613 the resulting page the page body is scanned 614 for resource locators. Selected resource locators (e.g. those referring specifically to local files, or all those relating to images) are identified within the page and replaced 615 with a corresponding peer-to-peer resource locator.

The APP is responsible for loading the inserted images when the page itself is loaded. Links for files are implemented in a similar manner, except that a file-chooser dialog box may be opened to select a file to which to link. Links to web pages are also implemented in this manner using a DHTML insert link dialog. Links to web pages can take one of a number of forms: the conventional "http:// . . . " form if the web page is available on a remotely accessible internet site or web server, or "p2p://<peer_identifier>/http:// . . . " if the web page is only available on a local intranet or web server and access is to be provided to a user unable to access the local intranet or web server.

Links to wiki pages use Java GUI's, via DDE, to select the wiki page to be linked to. The link is then inserted into the page as a link of the form <peer_locator><page_name>. Various concrete syntaxes could be employed in practice to denote the page.

Figure 7:
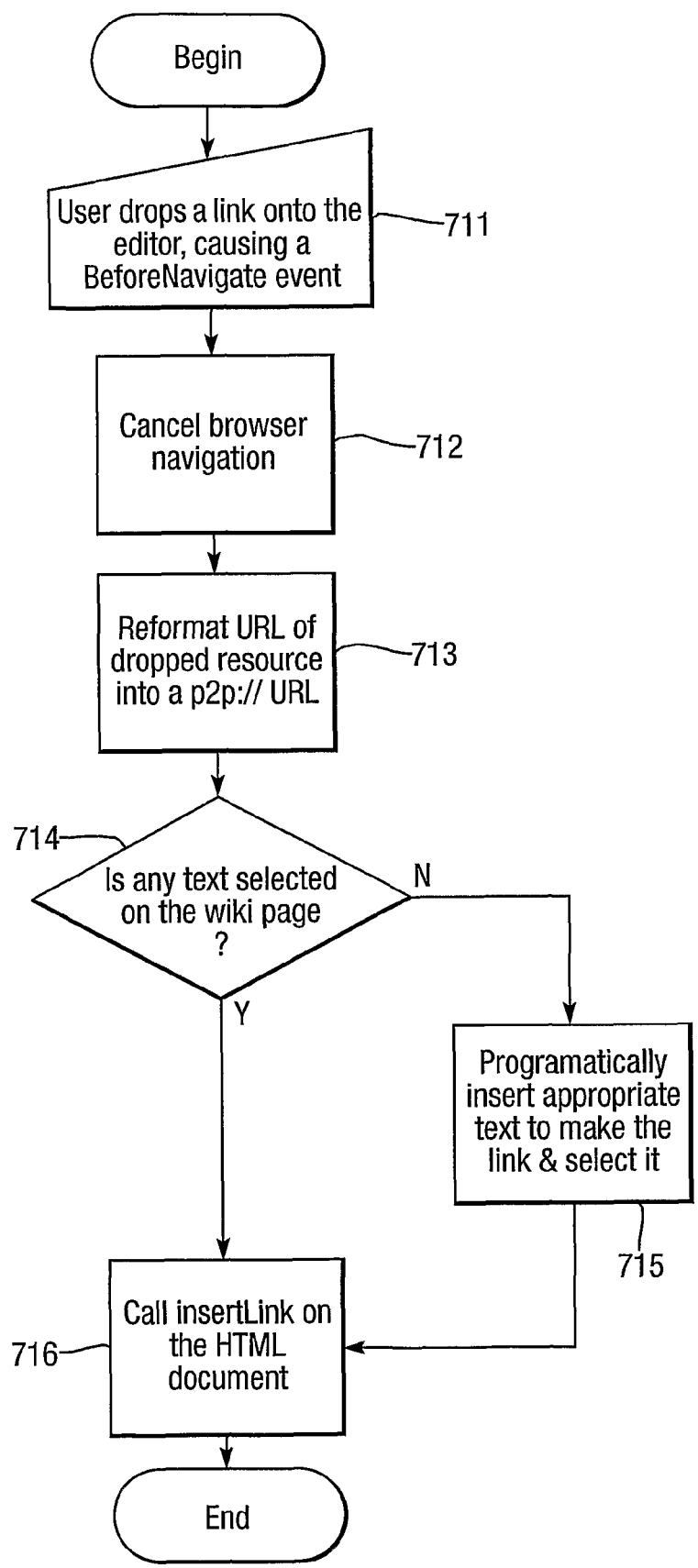
FIG. 7 shows a flowchart of a drag-and-drop method for inserting hyperlinks according to the present invention.

Referring now to FIG. 7 the drag-and-drop approach may be implemented by catching 711 the resultant BeforeNavigate Internet Explorer IWebBrowser2 event, cancelling the navigation 712 and inserting 713 an appropriate "p2p:// . . . " link to the resource dropped on the browser window.

If the user does not select 714 visible text with which to associate the hyperlink to be inserted, then the drag-and-drop editor may automatically insert suitable text 715 (for example the textual form of the resource locator). In either case completion of the hyperlink insertion follows 716.

Conventional remotely-usable resource locators (e.g. http://myhttpfile.htm) may, but need not, be extended to include a peer locator According to whether they are to be made accessible beyond the present domain as described above.

Many other software tools may also be provided to operate upon such peer-to-peer resource locators including editors supporting insertion of hyperlinks in textual form (rather than dragging and dropping icons) and tools arranged to update pages containing resource locators as and when peer identifiers are modified.

Whilst the embodiments described above have been based upon a specific operating system and applications programs (e.g. browsers) it will be apparent to the person skilled in the art that other embodiments employing other operating system and applications programs are envisaged within the scope of the present invention.

Furthermore it will be understood that whilst the embodiments described refer to "local" and "remote" clients, the concept is not actually limited by the physical location of those clients relative to each other or to the files to be accessed. Rather the principle may be applied to any situation in which a first client has access via file management software to files typically not accessible over the web by current methods. The files may be resident on the same host machine as the client, or may be on a physically remote server. The second ("remote") client to whom access is granted by means of the new form of hyperlink may in principle be located either remotely as described above or may be physically located on the same host as the files to be accessed. However the second client need not have direct access to the non-webfiles directly accessible to the first client in order to access them by means of the extended resource locators described above.

Any range or device value given herein may be extended or altered without losing the effect sought, as will be apparent to the skilled person for an understanding of the teachings herein.

The invention claimed is:

1. A computer-readable memory device having instructions stored thereon, wherein the instructions are configured to cause at least one device to perform operations comprising:
generating a hyperlink comprising a first address portion and a second address portion according to a selection of an icon from a drag-and-drop user interface, wherein the first address portion identifies a network address of the local server application and the second address portion addresses a location in a memory system of the at least one device where the file is accessible, wherein the icon identifies the file, and wherein the hyperlink is automatically generated and includes concatenating the first address portion with the second address portion;
receiving a file request at a local server application in the at least one device, wherein the file request is received from a client requesting a file, wherein the file request comprises the first address portion and the second address portion;
analyzing the second address portion to identify a type of memory system access that is requested by the file request;
retrieving the file from the location in the memory system with the local server application or with a hypertext transfer protocol (HTTP) server application in the at least one device based on the type of memory system access requested by the file request; and
transmitting, by the local server application in the at least one device, the file to the client.

2. The computer-readable memory device according to claim 1, wherein the first address portion further identifies a network domain associated with the at least one device, and wherein the client is associated with a different network domain.

3. The computer-readable memory device according to claim 2, wherein the second address portion identifies an address of the memory system in the network domain.

4. The computer-readable memory device according to claim 2, wherein the file is directly accessible from the network domain based on the second address portion.

5. The computer-readable memory device according to claim 1, wherein the first address portion is analyzed by the client to identify the network address of the local server application.

6. The computer-readable memory device according to claim 1, wherein the operations further comprise transferring the file request across multiple peer entities identified by successive hypertext transfer protocol (HTTP) addresses in the file request.

7. An apparatus, comprising:
means for generating a hyperlink comprising a first address portion and a second address portion according to a selection of an icon from a drag-and-drop user interface, wherein the first address portion identifies a network address of the local server application in the apparatus and the second address portion includes an address of a memory device in the apparatus where a file resides, and wherein the second address portion is separately denoted in the file request from the first address portion, wherein the icon identifies the file, and wherein the hyperlink is automatically generated and includes concatenating the first address portion with the second address portion;
means for receiving a file request comprising the first address portion and the second address portion;
means for analyzing the second address portion to identify a type of memory system access that is requested by the file request; and
means for retrieving the file from the memory device identified by the second address portion with the local server application in the apparatus or with a hypertext transfer protocol (HTTP) server application in the apparatus based on the type of memory system access requested by the file request.

* * * * *